Feb. 21, 1950 J. L. CLARK 2,498,529

HIGH-FREQUENCY OSCILLATOR

Filed April 30, 1946 2 Sheets-Sheet 1

INVENTOR
JAMES L. CLARK
BY
William D. Hall
ATTORNEY

HIGH-FREQUENCY OSCILLATOR

Filed April 30, 1946 2 Sheets-Sheet 2

INVENTOR
JAMES L. CLARK

BY
William D. Hall
ATTORNEY

Patented Feb. 21, 1950 2,498,529

UNITED STATES PATENT OFFICE 2,498,529

HIGH-FREQUENCY OSCILLATOR

James L. Clark, Elmhurst, Ill., assignor to United States of America as represented by the Secretary of War Application April 30, 1946, Serial No. 666,006

4 Claims. (Cl. 250—36)

This invention relates in general to electrical circuits, and more particularly to electrical oscillator circuits having a relatively wide frequency range.

Oscillators employing thermionic tubes have their frequency range limited, to a large extent, by the type of tank circuit employed. Thus, circuits with conventional coils and condensers are practical for frequencies ranging into the high frequency and very high frequency region of the electromagnetic spectrum. If a very low power output is not considered undesirable, fussiness in design and construction can be employed, which may result in the range of this type of oscillator being pushed to the higher end of the very high frequency range and into the ultra high frequency range. Frequencies at the upper end of the very high frequency range are quite often generated by circuits utilizing parallel conductor transmission lines. Such transmission lines cannot be used with efficacy in the lower end of the very high frequency region, because the lengths of the lines become excessive, and the Q of the tank circuit becomes too low.

A disadvantage of parallel conductor transmission lines as tank circuits lies in the relative awkwardness of the unit, the conductors often protruding straight out from the remainder of the oscillator a distance of several feet. Such devices often require a fairly complicated means of tuning, which is usually reflected in the overall cost of the unit.

Accordingly, among the objects of the present invention are:

1. To provide an oscillator capable of operation in the very high frequency range of the electromagnetic spectrum;
2. To provide such an oscillator having a very wide frequency range; and
3. To provide such an oscillator in which some of the disadvantages of the type of transmission line oscillators used in the prior art are absent.

In accordance with the present invention, there is provided a push-pull, plate-tuned oscillator circuit utilizing two tubes and two tank circuit components. The tank circuit consists of two spirals of copper ribbon with a movable shorting bar used to vary the lengths of the spirals effective in producing tube oscillations. Energy is coupled from the circuit by means of a balanced coaxial line loop having a contour similar to that of the turns of the spiral coils, this balanced line feeding into a single coaxial line.

This invention will best be understood by reference to the accompanying drawings, taken in connection with the appended claims and this specification, in which:

Figures 1, 2:
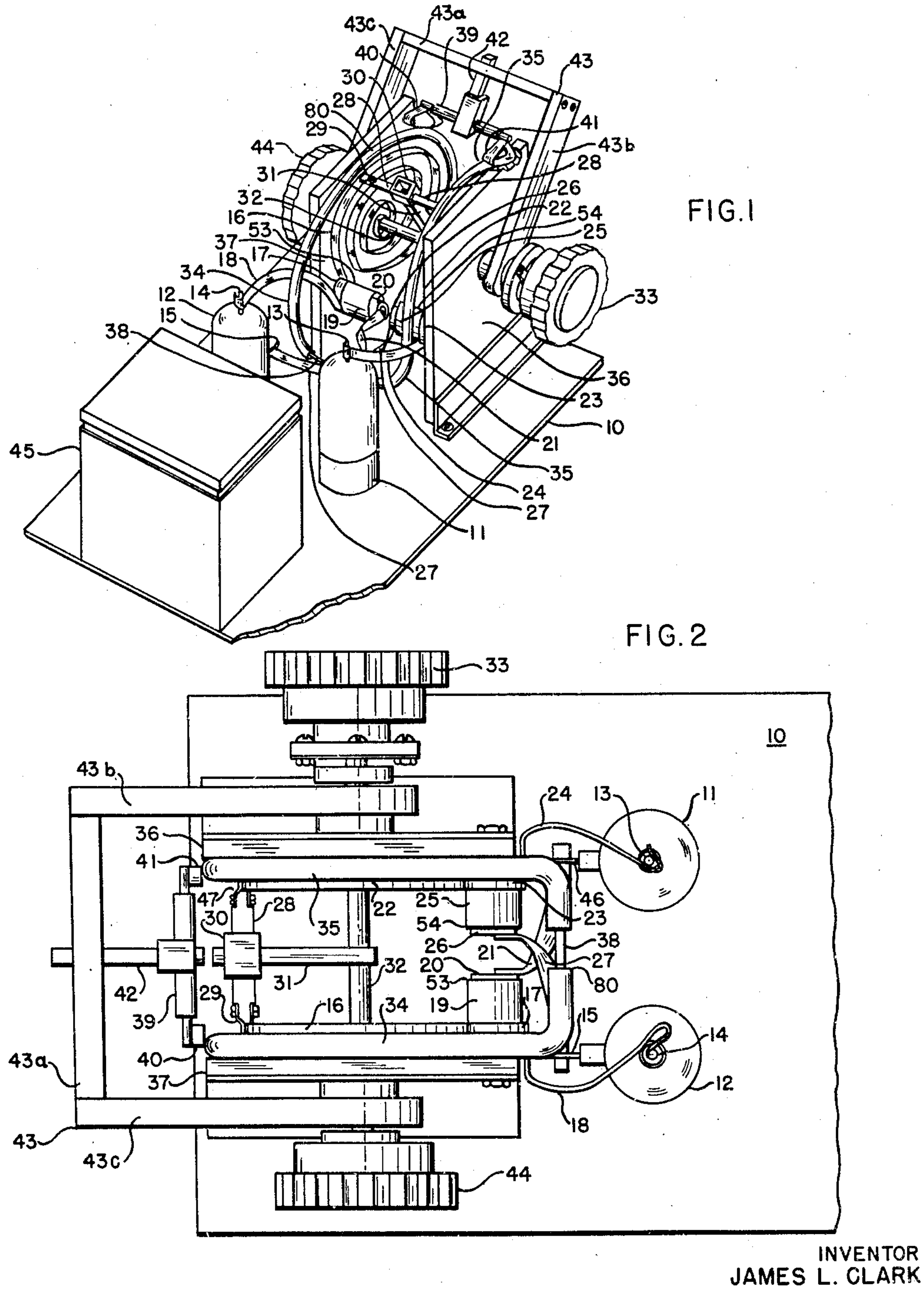
Fig. 1 is a perspective view of an oscillator embodying the principles of the present invention.
Fig. 2 is a top view of the oscillator of Fig. 1, making clear some of the details of the structure not brought out in connection with Fig. 1.

Referring now to a description of an embodiment employing the principles of the present invention and to Fig. 1, the oscillator structure is mounted upon a flat surface 10. Upon this surface are mounted, in a symmetrical manner, two triode vacuum tubes 11 and 12. It is desirable that these tubes have a type of structure in which the plate lead is brought out of the top of the tube, and the grid lead is brought out of the side of the tube. One tube having a preferred type of construction and having desirable properties for use with the hereindescribed circuit is the 3C24. In connection with tube 11, the plate lead 13 is the only externally-projecting electrode connection that can be seen in Fig. 1. With respect to tube 12, plate lead 14 protrudes out of the top of the tube in a direction parallel to, and collinear with, the long axis thereof, and grid lead 15 extends out of the side of the tube perpendicular to the long axis thereof.

The tank circuit component associated with tube 12 is a spirally-wound coil 16 of ribbon wire. This coil is connected to plate lead 14 through ribbon wire sections 17 and 18, and has its inner end held in place by shaft 32. Feedback from the plate of tube 12 to the grid of tube 11 is accomplished by means of condenser 53, which consists of two coaxial cylinders, outer cylinder 19 and inner cylinder 20, with a dielectric, preferably polystyrene, positioned between them. Ribbon wire section 17 in the plate circuit of tube 12 is made to take the contour of the outside cylinder 19 of the feedback condenser 53 so that good contact can be achieved between these two conducting members. The inner cylinder 20 of this condenser is connected, by means of a ribbon wire 21, to the grid lead of tube 11, this lead not being discernible in Fig. 1. The condenser 53 can be made variable by moving the inner conductor along its axis, with respect to the outer conductor, by means of a suitable screw arrangement.

The tank circuit component associated with tube 11 is the spirally-wound coil 22, only a portion of which can be seen in Fig. 1, which is connected to the plate lead 13 through two ribbon wire sections 23 and 24, and has its inner extremity held in place by shaft 32. This spiral coil is preferably positioned so as to be substantially parallel with the spiral coil associated directly with tube 12. Section 23 is molded so as to conform to the shape of a portion of the outer cylinder 25 of the feedback condenser 54. Condenser 54 has substantially the same physical and electrical properties as condenser 53. The inner cylinder 26 of condenser 54 is shown connected to the grid lead 15 of tube 12 by means of ribbon wire 27.

Movable shorting bar 28 is used to short spiral coil 16 to spiral coil 22, and utilizes slidable contact 29 to slide on coil 16, and another slidable contact, not shown in Fig. 1, to slide on coil 22. It is desirable that these contacts be made up of a number of spring fingers, all these fingers sliding on the coil at one time, thus providing a number of parallel paths for the plate current. Shorting bar 28 has its center section transformed into a cube-shaped, hollowed-out portion 30. Into the square hole in portion 30 is fitted a square arm 31, the opposite end of this arm being securely affixed to shaft 32. Arm 31 fits into the hole in portion 30 in a tight, but slidable manner. Knob 33 is coupled directly to shaft 32, so the turning of this knob results in motion of the shorting bar 28 along spiral coils 16 and 22. Insulating walls 36 and 37, made preferably of polystyrene, are used as supporting means for shaft 32.

Power is extracted from the oscillator circuit by means of an arrangement comprising a coaxial line 80, having an outer conductor 34 and an inner conductor 38, bent so as to be positioned in the near vicinity of the spiral coil 16, and a piece 35 of conducting tubing bent so as to follow the general contour of the spiral coil 22. At the tube end of this coupling circuit, a short length of the inner conductor 38 of coaxial line 80 is exposed, and is soldered to the end of the tubing 35. On the other side of the spiral coils, the two sections are brought together in a connector not shown in Fig. 1, which will be described in more detail in connection with Figs. 3 and 4.

The amount of coupling is varied by means of a shorting bar 39 which contacts the outer conductor of the coaxial line 80 by spring contact 40, and slides on the piece 35 of tubing by contact 41. Motion is transmitted to shorting bar 39 through arm 42 and yoke 43, which are rotated by knob 44. A rotation of knob 44 does not, however, cause motion of shaft 32. Both arm 42 and yoke 43, consisting of cross-bar 43*a* and side bars 43*b* and 43*c*, are constructed of an insulating material. Shielded box 45 may be employed to house components of circuits auxiliary to the oscillator proper.

Fig. 2 is a top view of the arrangement of Fig. 1, and is presented here to bring out details not emphasized in the showing of Fig. 1. The symmetrical nature of the structure will be evident from Fig. 2. The end view of the plate leads 13 and 14 of tubes 11 and 12, respectively, may be seen, and it will be noted that the grid leads 46 and 15, respectively, of these tubes are positioned so as to be symmetrical with respect to one another. In the tank circuit component associated with tube 12, which consists of the combination of spiral coil 16, section 17, and section 18, all of ribbon wire, it is desirable to have the least number of soldered joints practicable. To this end, one embodiment of this structure utilizes coil 16 and section 17 of one piece of wire, while section 18 is another piece soldered onto section 17, this arrangement being employed because of the sharp bend in the wire between the two latter-mentioned pieces. One end of ribbon wire 18 is wrapped securely around plate lead 14. The construction of the tank circuit component associated with tube 11, consisting of the combination of spiral coil 22, section 23 and section 24, can also be more clearly observed with reference to Fig. 2. The shorting bar 28, used to determine the lengths of the spiral coils that are to be effective as the oscillator tank circuit, makes contact with the two coils 16 and 22 by means of slidable fingers 29 and 47, respectively. This shorting bar has motion transmitted directly to its center portion 30 through arm 31, shaft 32, and knob 33.

The ribbon wire 27 connecting the grid lead 15 of tube 12 to the inner cylinder 26 of plate feedback condenser 54 is given a quarter twist, as shown. A similar twist is given to ribbon wire 21 which couples the grid lead 46 of tube 11 to the inner cylinder 20 of the condenser 53.

The output coupling arrangement consists of a coaxial line 80 with an outer conductor 34 and an inner conductor 38, and a piece of conducting tubing 24, one end of the inner conductor 38 being soldered to the wall of the conducting tubing 24 at the termination thereof. The shorting bar 39, used to fix the effective length of the two halves of the coupling loop, makes contact with the tubing 24 through the spring, triangular-shaped loop 41, and with outer conductor 34 through the spring, triangular-shaped loop 40. Motion is transmitted to shorting bar 39 through arm 42, yoke 43 and knob 44.

Insulating walls 36 and 37 are used to support the shafts leasing from knob 33 and knob 44, and base 10 is used to support the entire assembly.

The means of connecting tubing 24 to coaxial line 80 which is positioned at the back end of the structure, is omitted from Fig. 2 for the sake of clarity.

Figure 3:
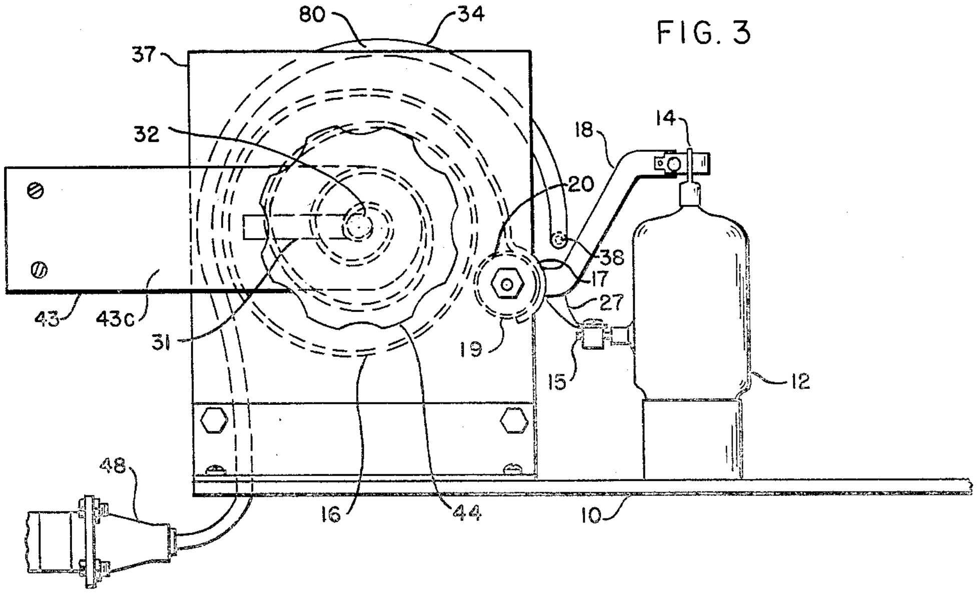
Fig. 3 is a side view of the oscillator of Fig. 1, also accentuating some of the details of this structure not clearly shown in Fig. 1.

Further details of the arrangement of the present embodiment, especially relative to the spiral coils and the output section of the output coupling members, will become apparent by reference to Fig. 3. Several portions of the structure are omitted in this drawing, in order to make the features desired to be stressed in this figure stand out more distinctly. Only one (12) of the tubes is shown, with its plate lead 14 and its grid lead 15. A portion of the end of the grid ribbon wire 27 can be observed. A side view of the plate tank circuit component, comprising the combination of section 18 connecting to plate lead 14, section 17 and spiral coil 16, brings out the design of the spiral and the method of connecting this structure to shaft 32. It will be noted that section 17 is made to follow the contour of a portion of the outer cylinder 19 of the feedback condenser 53. The outer conductor 34 of the coaxial line portion of the output coupling structure is seen to follow the approximate contour of the spiral coil 16, the coaxial line terminating in connector 48. The outlines of yoke 43 and of arm 31 are discernible, as are wall members 37 and base 10.

Figure 4:
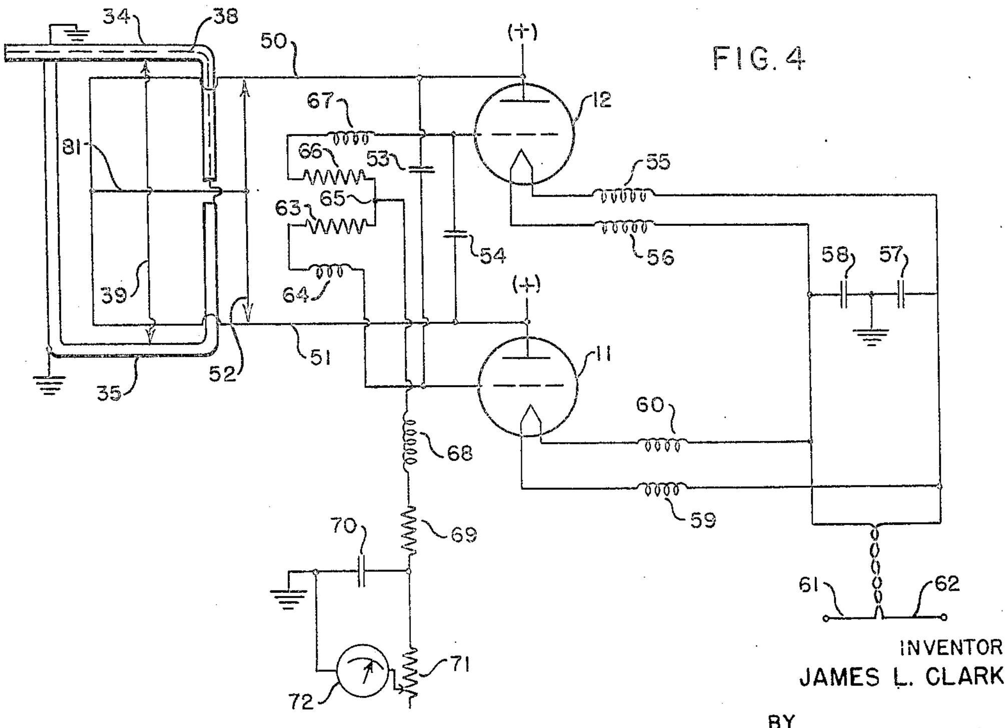
Fig. 4 is a schematic circuit diagram of the oscillator of Fig. 1.

Fig. 4 is a schematic circuit diagram of this particular embodiment. The circuit will be seen to be a push-pull, plate-tuned oscillator circuit. The tank circuit, comprising transmission lines in the form of spirally-shaped coils, consists of line 50, which represents the series combination of ribbon wire sections 16, 17 and 18, and which is connected to the plate of tube 12, and line 51, which represents the series combination of ribbon wire sections 22, 23, and 24, and which is connected to the plate of tube 11. Slidable connector 52, which is movable along lines 50 and 51, represents shorting bar 28 in combination with spring fingers 29 and 47. The mid-point of the shorting member 52 is joined to the connecting point of lines 50 and 51 by connection 81, because coils 16 and 22 terminate on shaft 32, as does the arm 31 leading from shorting bar 28. The schematic drawing of the output coupling arrangement is in substantially the same detail as is the actual structure. The half loop of tubing 35 is grounded at one point along its length, is soldered to the outer conductor 34 of the coaxial line 80 at one end, and is soldered to the inner conductor 38 of the coaxial line 80 at its other end. The plate of tube 12 is connected to the grid of tube 11 through condenser 53, which represents the feedback condenser consisting of cylindrical plates 19 and 20. Similarly, the plate of tube 11 is connected to the grid of the tube 12 through condenser 54, which represents the feedback condenser comprising cylindrical plates 25 and 26.

In the filament leads of tube 12, choke coils 55 and 56, are placed and are returned to ground through condensers 57 and 58, respectively. The choke coils 59 and 60 in the filament leads of tube 11 are also connected to condensers 57 and 58, respectively. The filament current is fed to these tubes, in parallel, through leads 61 and 62 from a suitable source (not shown). The grid of tube 11 is connected to a common point 65 through resistor 63 and coil 64, while the grid of tube 12 is connected to the point 65 through resistor 66 and coil 67. This common point is connected to ground through coil 68, resistor 69 and the meter circuit comprising condenser 70, rheostat 71 and ammeter 72.

The operation of the described embodiment of the present invention will now be discussed. It will be noted that the spiral coil tank circuit is essentially a combination of a transmission line tank circuit and an inductive coil tank circuit. The length of the plate current path is made to be great enough so that it is an appreciable fraction of a wavelength, which gives it some of the characteristics of a transmission line type of tank circuit. The spiral form that the lines take, however, causes an increased inductance over that of a straight-wire transmission line circuit, and so provides the additive effect of a coil type of tank circuit. The tuning characteristic that this circuit was found to have is between that of a conventional coil type and a transmission line type of circuit.

The tank circuit is tuned by varying the effective length of the spiral coils by means of the shorting bar. The resonant frequency is thus fixed by the length of the coils in wavelengths together with the added effect of the inductance between turns in the spiral.

With this circuit, a relatively very wide frequency range may be obtained, one configuration in practice providing a range between 60 and 325 megacycles, with a radio frequency power output varying from 50 to 25 watts as the frequency increases over this region. As the low frequency end of the range is approached, i. e., as the shorting bar 28 is moved away from the plate leads, it is believed at this time, with the spiral tank, that the distributed capacitance increases relatively slowly with respect to the inductance, with the result being a wide band of output frequencies. Besides providing a relatively wide frequency range, this type of spiral coil tank circuit results in a smaller, more compact unit than that used in the prior type of transmission line oscillator. The tuning mechanism for the present circuit can also be made relatively compact.

Ribbon wire in plate and grid circuits is set forth here as a preferable type of conductor to use. Other types of conducting means may be employed but, in general, the results may not be as satisfactory as those obtained with the use of ribbon wire. A primary purpose in using ribbon wire over the conventional type of wire is the increased surface area of the ribbon type. An increased surface area means a decreased resistance to current flow, since, at the frequencies at which the oscillator in the one embodiment is intended to operate, the current flows through a thin surface sheath of conductor and, hence, a higher Q and a greater stability for the circuit may be obtained. Ribbon wire also allows the effective use of multiple contact fingers 29 and 47, providing a relatively low inductance path at this point in the circuit, the point of maximum radio frequency current. The smaller this contact inductance, the higher will be the upper frequency range of the oscillator. The use of tubing for conductor 35 is also preferable because of its lower resistive properties.

Condensers 53 and 54 should be very small, because of the relatively high frequencies involved. One effective way of providing these low capacitances is to construct the condenser of two coaxial cylinders between which is positioned a dielectric such as polystyrene. This may provide a small, easily variable capacitance.

The particular type of output coupling described here was chosen because of its property of transforming from a balanced to an unbalanced type of circuit. Since the present circuit is a push-pull oscillator, the electromagnetic field emanating from one spiral coil is, at any instant, 180° out of phase with the electromagnetic field from the other coil. To couple energy from both of these fields at the same time, this type of coaxial line-single conductor type of coupling is desirable. It can be seen that the tubing, which receives energy from one coil, is connected to the center conductor of the coaxial line. The outer conductor of this coaxial line, however, receives energy from the other coil, and so is 180° out of phase with the center conductor, thus achieving the result desired. In general, it may be said that the connections in this circuit are such that the energy induced in one side of the coupler reinforces the energy induced in the other side. The effective mutual inductance between the plate coils and the output coupling loop is varied by changing the position of the shorting bar 39, thus varying the amount of coupling to the output circuit. Coupling is at a maximum when the shorting bar is at the grounded end of the loop.

Referring now to the circuit diagram of Fig. 4, it is observed that the tank circuit, essentially comprising transmission lines 50 and 51, is connected not only between the plates of the two tubes, but also between plate and grid of each tube, condensers 53 and 54 being used as low impedance paths in this respect. The push-pull effect, therefore, can be clearly seen. Another purpose of condensers 53 and 54 is to help to provide the bias voltage for the two tubes. These condensers can be easily charged from the positive voltage sources connected to the plates, when the grids of the tubes go positive, but must discharge through resistors 69 and either 63 or 66, thus providing a relatively long time constant discharge path. The average flow of current through these resistors provides bias for the two tubes. The meter 72 is used to give an indication of grid current flow from both tubes.

It may be desirable to provide a single-knob tuning arrangement, whereby the output power varies in a predetermined manner. This can be accomplished by gearing the axle about which yoke 43 turns and shaft 32 to the single knob.

While there has been described what is at present considered to be the preferred embodiment of the invention, it will be obvious to those skilled in the art that various changes and modifications may be made therein without departing from the spirit of the invention, and it is, therefore, intended to cover all such changes and modifications as fall within the true spirit and scope of the invention.

What is claimed is:

1. In combination, a push-pull variable frequency electronic oscillator, a first thermionic tube, a second thermionic tube, a tank circuit comprising a first and a second coil, said first coil being associated directly with said first tube, said second coil being associated directly with said second tube, each of said coils having a spiral shape, the lengths of said coils being an appreciable fraction of the operating wavelength, first movable short-circuiting means connecting said first and said second coils, whereby movement of said first short-circuiting means varies the electrical length of said coils, means for feeding energy back from said first tube to said second tube and from said second tube to said first tube; and an adjustable output means comprising a coaxial line having an inner conductor and an outer conductor, said outer conductor being positioned near said first coil and having a shape similar to that of the outside loop of said first coil, a single wire conductor positioned near said second coil and having a shape similar to that of the outside loop of said second coil, one end of said single wire conductor being connected to the inner conductor of said coaxial line at a first point on said coaxial line, the other end of said single wire conductor being connected to the outer conductor of said coaxial line at a second point on said coaxial line, and second movable short-circuiting means for adjusting the electrical length of said output means.

2. A high frequency oscillator of compact size and wide tuning range comprising a chassis, a first electron discharge device, a second electron discharge device, each of said devices having an anode, a cathode and a control grid, said devices being mounted adjacent to each other, a pair of opposing walls vertically mounted upon said chassis, a rotatable shaft extending between and through said walls, first and second spiral ribbon conductors centrally disposed about said shaft between said vertical walls, each of said conductors connected to an anode of said discharge devices, a rod mounted upon said shaft, a crossing member adapted for slidable longitudinal movement along said rod, said crossing member having contact means for engaging said spiral conductors whereby said conductors will be electrically connected, means for rotating said shaft to adjust the position of said crossing member thereby varying the electrical length of said spiral conductors, adjustable output means comprising a coaxial transmission line having an outer and inner conductor, said outer conductor being disposed concentrically with said first spiral conductor, said inner conductor being extended and said extended portion being disposed concentrically with said second spiral conductor, a yoke straddling said coaxial line and supported at two points external of said vertical walls, said yoke having shorting means cooperating with said inner and outer conductors, and means for rotating said yoke to move said shorting means along said coaxial line whereby the coupling will be adjusted.

3. A variable frequency oscillator comprising a chassis, first and second vacuum tubes, each of said vacuum tubes having at least an anode, cathode and control grid, said first and second vacuum tubes being mounted adjacent to each other, a pair of opposing walls vertically mounted on said chassis, a rotatable shaft extending between and through said walls, first and second spiral ribbon conductors centrally disposed about said shaft between said vertical walls, each of said conductors being connected to an anode of said vacuum tubes, a rod mounted upon said shaft, a crossing member mounted for slidable longitudinal movement along said rod, said crossing member having contact means for engaging said spiral conductors whereby said conductors will be electrically connected, means for rotating said shaft to adjust the position of said crossing member whereby the electrical length of said spiral conductors will be adjusted, first and second capacitors mounted on said walls and connected to feed back energy to sustain oscillations in said oscillator, adjustable output means comprising a coaxial line having an inner conductor and outer conductor, said conductor being disposed adjacent to one of said spiral conductors, said inner conductor being extended and said extended section being disposed adjacent to the other of said spiral conductors, a yoke supported on said shaft at points external of said vertical walls, shorting means mounted upon said yoke comprising an inwardly extending member and a crossing member having contact means for electrically shorting said outer and inner conductors.

4. In a variable frequency oscillator structure having a pair of spirally wound conductors forming a tank circuit, adjustable output means comprising a coaxial transmission line having an outer conductor and inner conductor, said outer conductor being disposed adjacent to one of said spiral conductors, said inner conductor being extended and said extended section being disposed adjacent to the other of said spiral conductors, a pair of opposing vertical walls flanking said conductors, a rotatable shaft extending between and through said walls, a yoke supported on said shaft at points external of said vertical walls, shorting means mounted upon said yoke comprising an inwardly extending member and a crossing member having contact means for shorting said outer and inner conductors.

JAMES L. CLARK.

REFERENCES CITED

The following references are of record in the file of this patent:

UNITED STATES PATENTS

| Number | Name | Date |
|---|---|---|
| 1,389,255 | McDonald | Aug. 30, 1921 |
| 2,126,541 | De Forest | Aug. 9, 1938 |
| 2,160,655 | Hansell | May 30, 1939 |
| 2,292,254 | Van Beuren | Aug. 4, 1942 |

Certificate of Correction

Patent No. 2,498,529 February 21, 1950

JAMES L. CLARK

It is hereby certified that error appears in the printed specification of the above numbered patent requiring correction as follows:

Column 8, line 34, before "conductor", second occurrence, insert *outer*;

and that the said Letters Patent should be read with this correction therein that the same may conform to the record of the case in the Patent Office.

Signed and sealed this 25th day of July, A. D. 1950.

[SEAL]

THOMAS F. MURPHY,
*Assistant Commissioner of Patents.*